March 15, 1932.  A. RAYSON  1,850,031
METHOD OF AND MEANS FOR DEFREEZING FROZEN
BEEF, MUTTON, LAMB, AND THE LIKE
Filed Aug. 21, 1928  2 Sheets-Sheet 1

Inventor
Arthur Rayson
by
Attys

Inventor
Arthur Rayson

Patented Mar. 15, 1932

1,850,031

UNITED STATES PATENT OFFICE

ARTHUR RAYSON, OF ELSTERNWICK, NEAR MELBOURNE, VICTORIA, AUSTRALIA, ASSIGNOR TO THE ANGLO-AUSTRALIAN DEFREEZING COMPANY PROPRIETARY LIMITED, OF MELBOURNE, VICTORIA, AUSTRALIA

METHOD OF AND MEANS FOR DEFREEZING FROZEN BEEF, MUTTON, LAMB, AND THE LIKE

Application filed August 21, 1928, Serial No. 301,048, and in Australia January 31, 1928.

This invention relates to the defreezing of frozen products such as meat and the like and has been devised to provide an effective, cheap and simple process and apparatus for accomplishing this object.

The invention is characterized by the means employed for melting the ice crystals caused by freezing the product, so as to return the said product to its original state (as before freezing) with the minimum drip.

Frozen meat can be safety transported when at a temperature of between 10° and 20° Fahr. at the bone, and in regard to transport by boat, low temperature treatment is essential since it has to be stacked in the lower holds, while in between decks the height of packing is limited owing to the relative proximity of the decks.

The fundamental principle of the invention consists in spraying the carcass with water at a suitable temperature whilst said carcass is revolving, then subjecting the carcass to a warm air blast and thence whilst the carcass is still revolving subjecting it to a cool blast of air.

Essential features embodied in the invention are substantially as follow:—

1. The use of means whereby the ice crystals in the carcass are melted leaving the said carcass in its original condition, i. e. prior to freezing, the operation being performed with the minimum of drip.

2. The arrangement of a series of chambers, each being in communication, one of said chambers accommodating ice, expansion coil or brine circulatory system and means for communicating one with the other.

3. The arrangement in a chamber of a fan preferably of the induction type, said fan being adapted to draw the air from the lower portion of the chamber and pass it out to the upper portion of the compartment thence to the upper portion of the chamber in which the carcass or like perishable is stored.

4. Means for continually rotating each carcass within the chamber.

5. Means for raising the temperature within the beef chamber and means for forcing a current of air into the said chamber and about the frozen products therein.

6. Spraying means within the beef chamber adapted to be directed upon the carcass as same rotates for the purpose specified.

7. Means for distributing the air volume on to the carcasses, the distribution being greater in volume at the middle portion of the carcass.

The invention contemplates a unit comprising a beef chamber, a fan compartment and a cooling compartment, the air and cooling compartments being not only separate from the beef chamber but separate from each other, thereby providing three distinct chambers.

Modifications according to conditions are provided for, as for instance, I arrange for the fan nozzle to be projected into a compartment separate from the fan compartments; while the end of the discharge pipe from the beef chamber also projects into this compartment but substantially above the fan nozzle, but if necessary I may connect the fan nozzle to the discharge pipe by a length of piping.

Further, I may, in lieu of having the heating means within the beef chamber, accommodate them in the fan compartment and draw the warm air therefrom and pass it into the discharge pipe for transmission to the beef chamber.

I have referred to a "beef chamber" but by this I do not wish to convey the impression that the chamber is solely for the treatment of beef, on the contrary, it is equally efficient in the de-freezing of lamb, mutton and all meat or products requiring treatment after prolonged freezing.

In order to more readily understand the invention it will now be described with reference to the accompanying drawings in which:—

Figure 1:
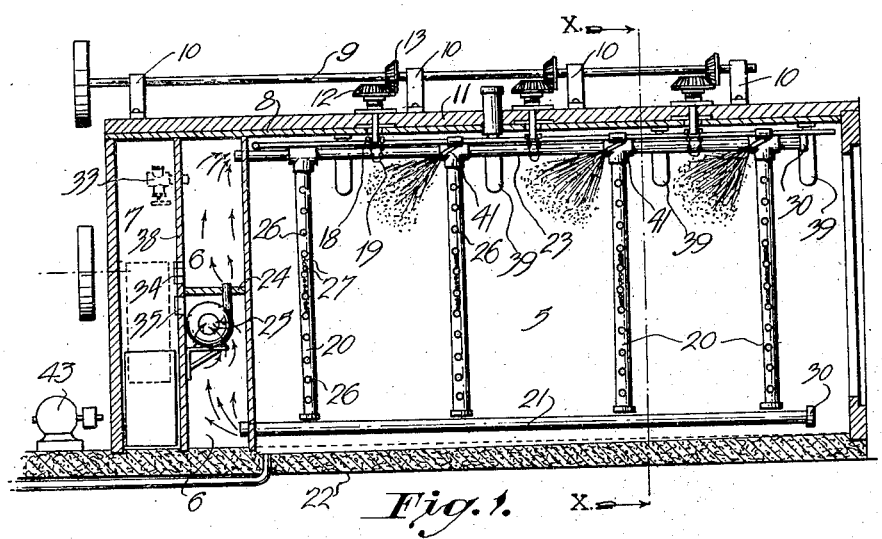
Figure 1 is a sectional elevation showing arrangement of a defreezing plant according to my invention.
Figure 2:
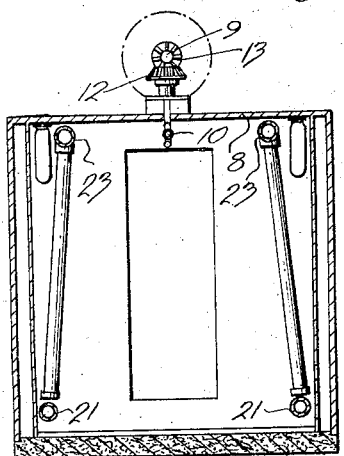
Figure 2 is a section on X X, Figure 1.
Figure 3:
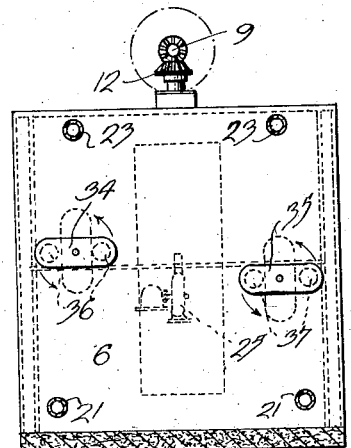
Figure 3 is a section showing arrangement of rear chambers.

According to this invention an insulated chamber 5 is provided having two smaller compartments at the rear thus providing three compartments, 5 comprising the beef chamber; 6 the fan and/or heater room and 7 the cooling compartment wherein ice blocks, expansion coil or brine circulatory system may be disposed.

The beef is placed in the chamber 5 suspended from the roof 8 on a hook that revolves being driven by an overhead shaft 9 preferably outside the chambers 5, 6 and 7, the shaft 9 being carried in bearings 10 on a beam 11 or like support disposed above the roof 8.

The mounting for the carcass forms one of the essential features of the invention and comprises, as already stated, hooks suspended from a revolving support.

It has been found in practice that the best results are obtained when employing a slow revolving motion.

The shaft 9 as herein described is carried in bearings 10 which are mounted upon a beam 11 carried across the roof of the chambers 5, 6 and 7.

The means of revolving the carcass supports is by means of bevel pinions 12 and 13, the pinions 12 being carried on short spindles 14 which are formed at the upper ends with collars 15 which are received in the bevel pinions 12, and in order to facilitate the revolving of the pinions the same are carried on ball bearings 16 resting on plates 17 on a transverse beam 17a.

The short spindles 14 project through the ceiling 8 sufficiently to receive a stud 18 adapted to support a chain 19 or like flexible connection which is adapted to receive a hook (not shown).

The object of the flexible connection 19 is to permit the carcasses being revolved, even at reasonably high speeds, without moving outwardly to strike the pipes 20 and consequently bruise the beef and furthermore, if no flexible connection were provided here difficulty would be experienced in starting the beef rotating means, as inertia would be difficult to overcome momentarily and a great torque would be imparted to the shafts 9 and 14 and possibly breaks would occur.

Figure 4:
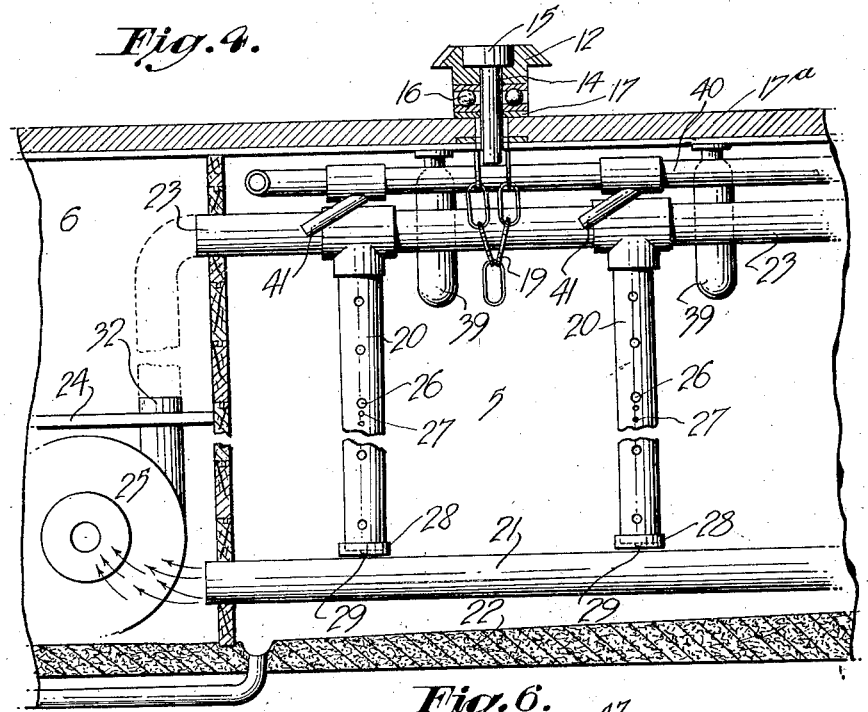
Figure 4 is an enlarged sectional detail illustrating more clearly the mechanism by which the operation herein is obtained.

In order to take the weight of the carcass and prevent the shaft 14 pulling the ceiling 8, the said shaft is formed at the upper end with a collar 15 which is received in the bevel pinion 12 as shown in Figure 4 and the same is keyed to said pinion (or the collar may be squared) to prevent voluntary rotation.

Running (approximately) the length of the chamber 5 are suction pipes 21 disposed a little above the floor 22 and parallel with each other and the chamber 5 while above the pipe 21 are delivery pipes 23 provided with the vertical down pipes 20, which are spaced so as to accommodate either a quarter of a carcass or a whole carcass between them.

Running down the centre of the chamber 5 is a pipe line 40 in communication with a water heating means (not shown) while at intervals along the said pipe 40 are specially designed nozzles 41 through which in the first instance, warm water is sprayed on to the product (as a side of beef) and when the surface of the said product is thawed to the correct extent warm air is sprayed through the same nozzles on to the revolving product or warm air is delivered through the holes 26—27. When the product is thawed to the bone, cool air from the compartment 7 is projected on to the revolving product until same is perfectly dry and free from ice.

I have found in practice that the water acts satisfactorily at a temperature of 80° Fahr. and the air if forced at 70° Fahr. is also satisfactory in the steps above mentioned.

The shaft 9 carrying the bevel pinions for driving the carcass revolving means is driven by a motor 43 which operates the shaft through a countershaft and pulley system of any suitable type.

As previously mentioned the fan compartments 6 and ice or cooling compartment 7 are at the rear of the main chamber 5, the pipes 21 and 23 projecting into said compartment 6 as shown.

The compartment 6 has a partition 24 therein and below this partition 24 is the fan 25 which draws the air from pipe 21 and rear passes it outwardly and upwardly to be drawn into the pipe 23, from which emanate the pipes 20 having large perforations 26 while arranged between the holes 26 and approximately in the middle of the beef chamber 5 are smaller perforations 27, so that the rib portion of the carcass will be treated with a greater volume of air than the neck and portions.

The bottom of each pipe 20 is closed by a cap 28 having a small orifice 29 therein adapted to permit the said pipes to drain off any moisture which may accumulate from time to time.

The ends of the pipes 21 and 23 are similarly closed in that caps 30 are provided while the pipes 21 are provided on the underside with perforations 31 by which the air and moisture is sucked from said chamber 5 by means of the pump 25 disposed as shown.

Figures 5, 6:
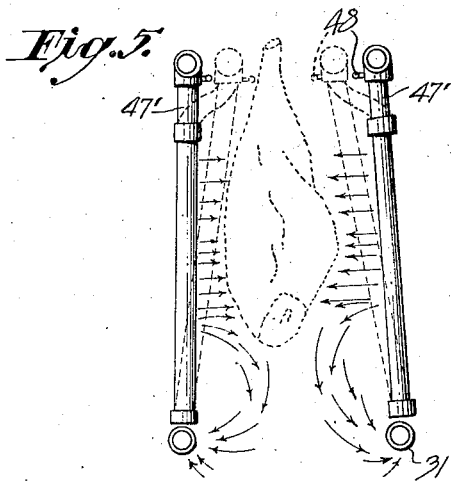
Figure 5 is a detail view showing the means employed for bringing the pipes nearer together in the case of small carcasses (as lambs).
Figure 6 is a detail view of one of the side pipes.
Figure 7:
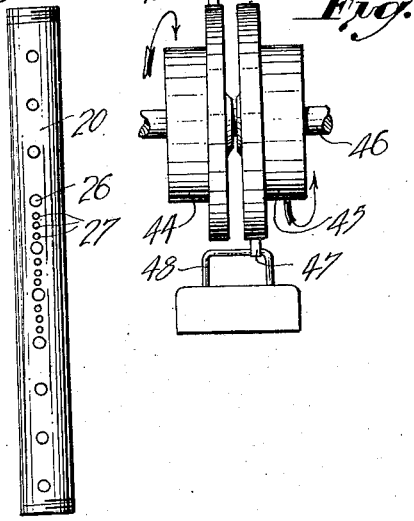
Figure 7 is a detail showing means for bringing the air heating means into and out of operation.

As the lower ribs do not require the same volume of air contact owing to the necessity of preventing the skin becoming parched, the air is sucked back into the pipe 21 through the perforations 31 and does not maintain sufficient contact to cause the parching of the skin, the air contact being substantially effected as indicated by dotted lines, Figure 5, the upper or skin portion being treated through a small number of air holes, the middle portion with a maximum number of air holes and lower rib portion by a small number of air holes in the pipes 20, the air being quickly deflected and sucked back to the pipe 21 at this lower rib portion.

It will be noticed that a space occurs between the end of the fan nozzle 32 and the pipe 23, but if necessary or desirable, a pipe may be disposed between the two as indicated by dotted lines, Figure 4, and in this instance a valve 33 will be fitted as shown (Figure 1) to equalize the pressure in the compartments 6 and 7.

Above and below the partition 24 are valves 34 and 35, which consist of pivoted shutters adapted to cover a port or ports 36, 37 in the wall 38 separating the chambers 6 and 7 and the object of this valve system is to permit cold air being sucked from the chamber 7 through the ports 37 and into the lower portion of the compartment 6 where it will be drawn through the fan 25 with the air from the pipe 21 and passed upwardly to the discharge pipe 23 or cold air can be admitted into the upper portion of the compartment 6 by uncovering the ports 36 or if preferred the boards upon which the valves are mounted can be totally removed revealing an opening of considerable area.

In Figures 1 and 4 lamps 39 are shown in the beef chamber 5 adapted to warm the air therein when necessary, but if desired, or should occasion demand it, such as the possibility of breaking the globes by swinging carcasses, said lamps may be accommodated in the chamber 6, since the function of these lamps is to warm the air surrounding the carcasses during treatment and it is not necessary that the lamps should be in the same chamber as the beef as the warm air can be forced into the beef chamber from a remote place.

It will be understood that other means may be embodied for warming the air. Furthermore, the air cooling means may also be accommodated within the fan chamber if necessary or desirable for space reasons.

Electrical means may be employed for operating the heating means, i. e. turning the lamps 39 on and off, but it is preferred to use more positive means for accomplishing this result and to this end I have found that by mounting two pulleys as 44 and 45 upon a shaft 46 and permitting one pulley as 42 to revolve freely thereon the operation will be performed as follows:—

By providing projecting lugs 47 upon the periphery of each pulley and causing said pulleys to revolve in opposite directions as by using a crossed belt on 44, the one pulley will lift the switch arm 48 upwardly while the other pulley will pull the said switch down, thus putting the lamps into or out of operation.

In defreezing small carcasses such as lamb, it is preferred to bring the air blast as near as possible to the said carcass and in order to accomplish this, I may connect the pipes 20 and 23 together by means of an "off set" coupling 47' (see Figure 5) which permits the pipes 23 being drawn nearer together with the pipes 20 as shown in dotted lines, Figure 5 and the pipes in question may be kept at the required position by means of a pin 48.

Thus the small carcasses may be subjected to the necessary air blast, whilst revolving.

To wash the chamber a water nozzle may be fitted near the door and deliver heated water to the chamber to thoroughly cleanse the same or any portion thereof.

What I claim as my invention and desire to secure by Letters Patent is:—

1. Method of defreezing frozen products consisting in first subjecting the product to a revolving motion and whilst revolving subjecting it to water the temperature of which is such that thawing will take place, then subjecting the product to a blast of warm air and with the product still revolving subjecting it to a blast of cool air for the purposes specified.

2. Method of defreezing frozen products consisting in subjecting the materials treated while revolving to the action of water at 80° Fahr. and then to warm air at a temperature of 70° Fahr. for the purposes specified.

3. In a method of defreezing frozen products, a step consisting in spraying water at a suitable temperature and under pressure upon a revolving carcass for the purposes specified.

4. A method of defreezing frozen meat carcasses which comprises delivering air under pressure in greater volume at the middle portion than at the neck and lower portions.

5. In a method of defreezing frozen products, the steps consisting of rotating the frozen product, and spraying warm water on the surface of the said product during rotation thereof.

6. A method of defreezing frozen products, comprising drawing in air from a chamber in which the treatment is in operation, passing the air to the product, discharging the said air against the product, and during the transference of said air admitting either warm or cold air to the chamber as the circumstances demand and for the purposes specified.

Signed at Melbourne, Victoria, Australia, this 23rd day of July, A. D. 1928.

ARTHUR RAYSON.